US008513559B2

(12) United States Patent
Brandstrom

(10) Patent No.: US 8,513,559 B2
(45) Date of Patent: Aug. 20, 2013

(54) APPARATUS FOR APPLYING WEAR COATING IN CONDUIT ELBOWS

(75) Inventor: Randel Brandstrom, Edmonton (CA)

(73) Assignee: SWA Holding Company, Inc., Wilmington, DE (US)

( * ) Notice: Subject to any disclaimer, the term of this patent is extended or adjusted under 35 U.S.C. 154(b) by 244 days.

(21) Appl. No.: 12/978,230

(22) Filed: Dec. 23, 2010

(65) Prior Publication Data

US 2012/0160811 A1   Jun. 28, 2012

(51) Int. Cl.
*B23K 9/04* (2006.01)
*B23K 9/025* (2006.01)
*B23K 31/02* (2006.01)
*B23K 11/30* (2006.01)
*F16L 3/00* (2006.01)
*B05B 13/06* (2006.01)
*B05C 3/02* (2006.01)

(52) U.S. Cl.
USPC ............. 219/76.1; 219/60 R; 219/61.11; 219/61.12; 219/61.13; 219/66; 248/49; 118/317; 118/408; 118/DIG. 10; 901/16; 901/24; 901/25

(58) Field of Classification Search
USPC ........... 219/60 R, 61.1, 61.11, 61.12, 61.13, 219/66; 248/49; 118/317, 408, DIG. 10; 901/16, 24, 25
See application file for complete search history.

(56) References Cited

U.S. PATENT DOCUMENTS

| | | | | |
|---|---|---|---|---|
| 1,951,221 A | * | 3/1934 | Taren | 118/408 |
| 2,139,771 A | * | 12/1938 | Riemenschneider | 219/60 R |
| 2,416,533 A | * | 2/1947 | Naumann | 264/180 |
| 3,009,049 A | * | 11/1961 | Stanley | 219/60 R |
| 3,106,735 A | * | 10/1963 | Landrum et al. | 118/663 |
| 3,387,761 A | * | 6/1968 | Pickard | 228/42 |
| 3,461,264 A | * | 8/1969 | Sims et al. | 219/60 R |
| 3,697,720 A | * | 10/1972 | Christopher | 219/611 |
| 3,703,947 A | * | 11/1972 | Landrum | 188/290 |
| 4,149,932 A | * | 4/1979 | Jacobs et al. | 376/249 |
| 4,419,041 A | * | 12/1983 | Rose | 414/739 |
| 4,424,473 A | * | 1/1984 | Gorman | 318/568.11 |
| 4,514,443 A | * | 4/1985 | Kostecki | 427/230 |
| 4,780,072 A | * | 10/1988 | Burnette | 425/62 |
| 4,800,104 A | * | 1/1989 | Cruickshank | 427/230 |
| 5,148,000 A | * | 9/1992 | Tews | 219/125.11 |
| 5,601,225 A | * | 2/1997 | Wood et al. | 228/9 |
| 2011/0126661 A1 | * | 6/2011 | Long | 74/490.05 |

FOREIGN PATENT DOCUMENTS

| | | |
|---|---|---|
| CA | 2302083 | 3/2000 |
| CA | 2578308 | 3/2008 |

* cited by examiner

*Primary Examiner* — Joseph M Pelham
*Assistant Examiner* — Gyounghyun Bae
(74) *Attorney, Agent, or Firm* — Miller Law Group, PLLC

(57) ABSTRACT

An apparatus applies a wear coating on the interior surface of conduits, particularly conduit elbows, in which the weld head applying a weld bead forming the wear coating is supported by a wheel engaging the bottom surface of the conduit and interconnected with a push/pull cart mounted on a linear support frame exteriorly of the conduit by a plurality of linkage elements. Each of the head element and the linkage elements include a centralizing joint having a pair of transversely opposing rollers that engage the lateral sides of the conduit to maintain a consistent positioning of the welding arm at the distal end of the apparatus. The welding arm includes a three-axis adjustment for the welding torch tip for accurate location thereof within the conduit. Positional adjustment of the welding torch tip is provided by independent electric motors associated with each pivot axis in the welding arm.

22 Claims, 10 Drawing Sheets

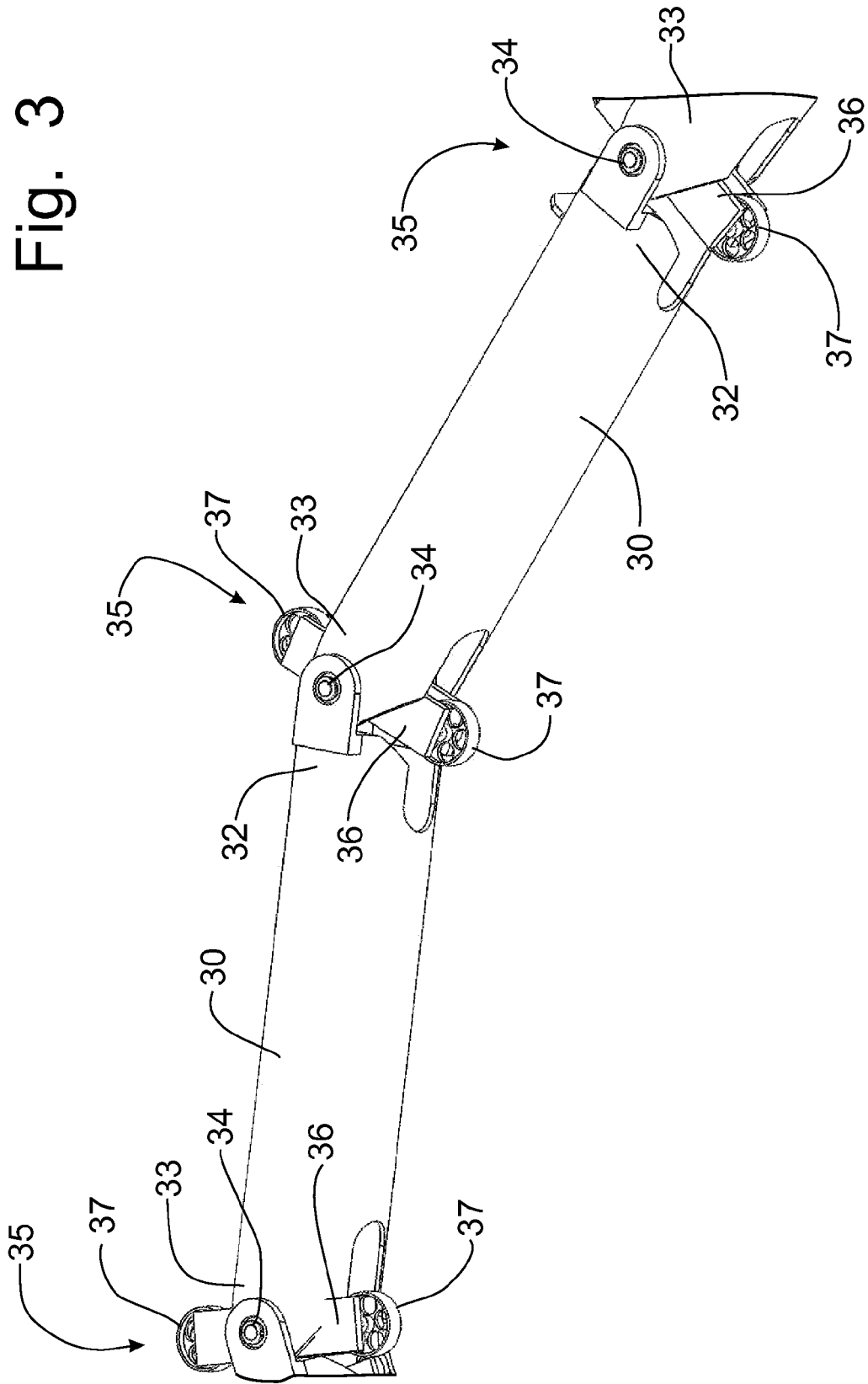

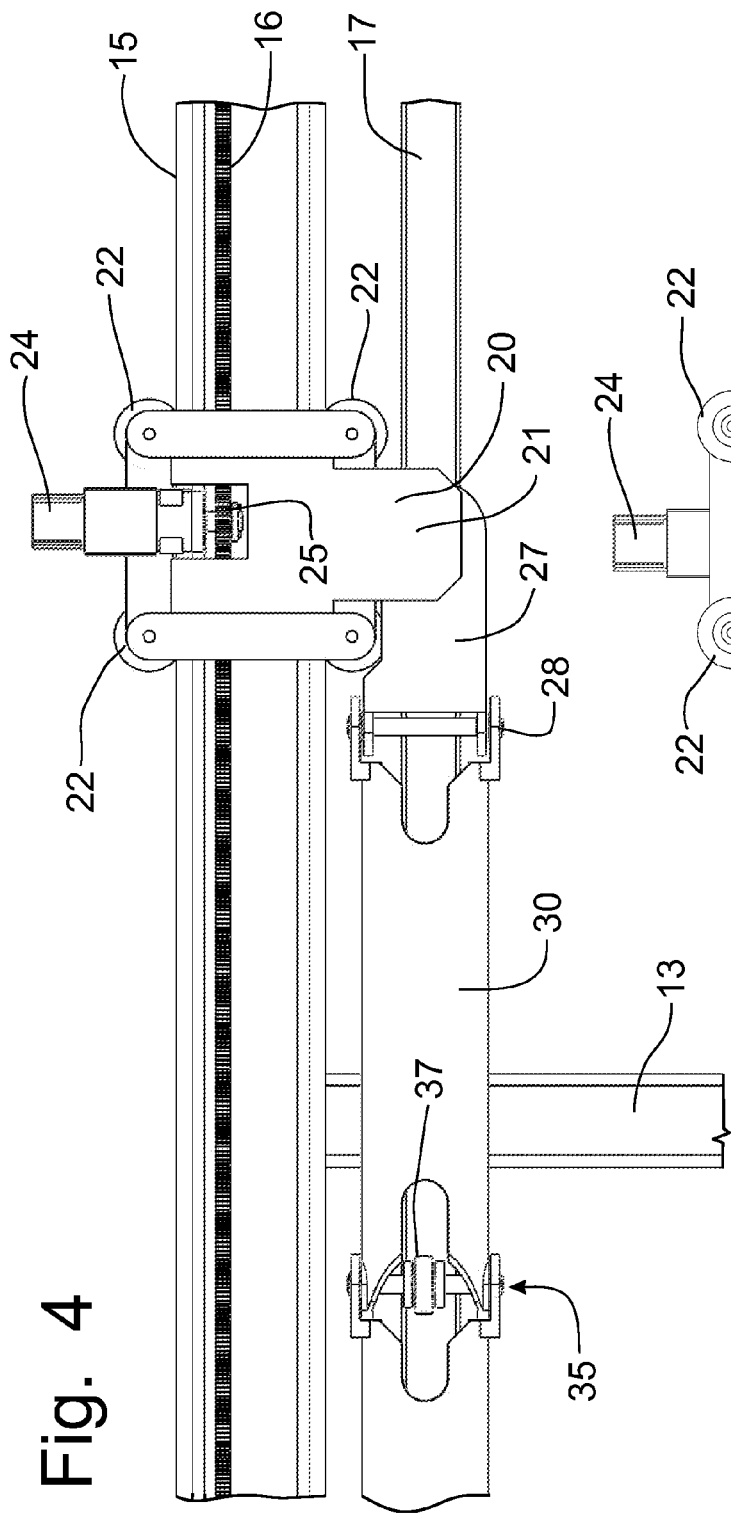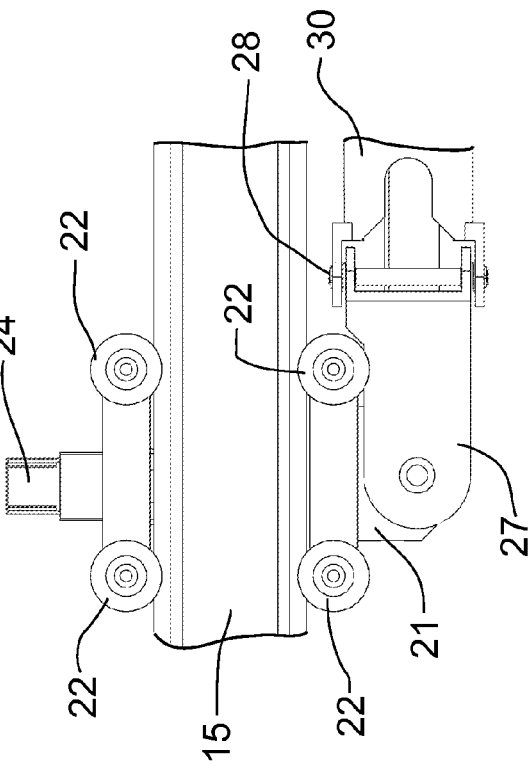

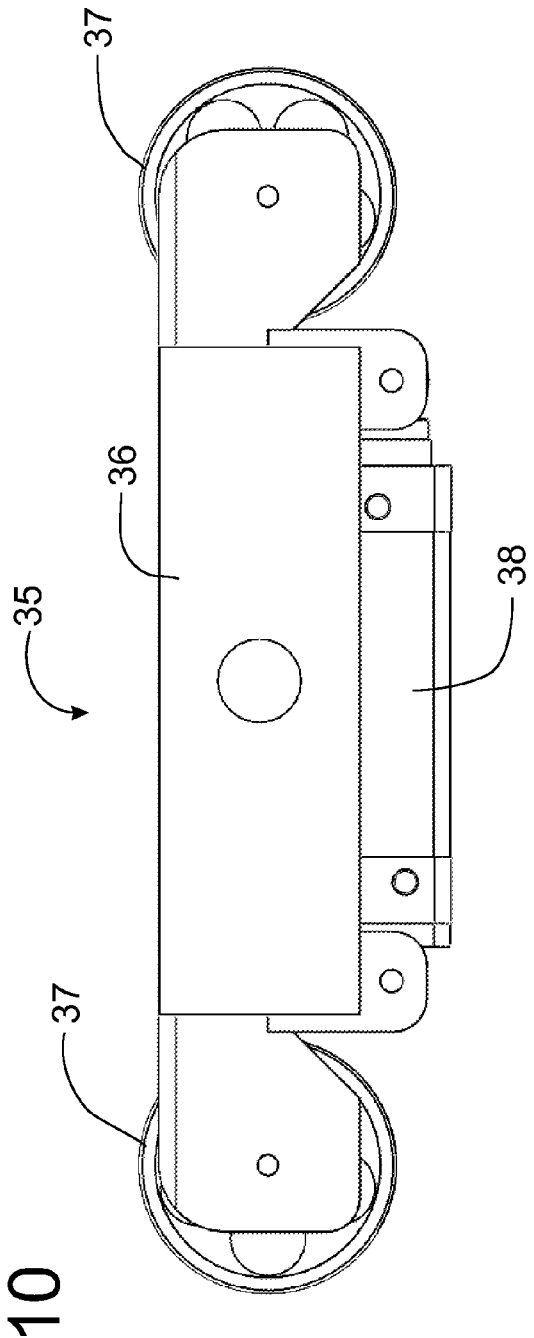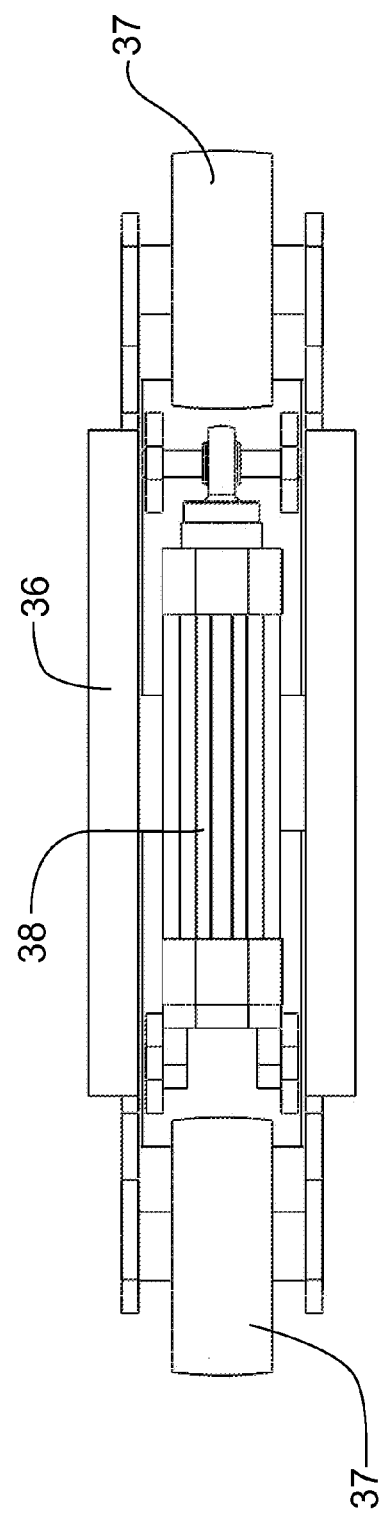

APPARATUS FOR APPLYING WEAR COATING IN CONDUIT ELBOWS

FIELD OF THE INVENTION

The present invention relates generally to an apparatus for the application of various coatings on the internal surface of conduits used for conveying liquid or gaseous products and, more particularly, to an apparatus that is operable to apply a hardened wear coating on curved conduit segments, such as elbows or other curved or straight conduit sections.

BACKGROUND OF THE INVENTION

Conduits are used to transport a variety of liquid and gaseous products, such as crude oil, liquid propane, ethanol, water, etc., such products encounter friction against the interior surface of the conduit. The friction between the product being conveyed and the interior surface of the conduit is greater in curved conduit sections than over linear conduit sections because of the changes in direction of the product imposed by the curved conduit and because of swirling of the product as the change in direction is undertaken. In some situations, the liquid is used as a medium to convey particulate material in suspension within the product, such as with mining slurries and sludge. Such particulate material can be extremely abrasive and magnify the wear cause by friction within the conduit.

To minimize the effects of friction on the interior surface of conduits, the conduits, particularly on curved conduit segments, can be coated with a wear surface, such as a carbide metal coating, that can be applied to the interior surface of the conduit. The application of a wear coating on the interior surface of conduits is called hard surfacing. The hard facing of conduits can be applied to new conduit or as a refurbishing of old conduit to replace the wear surface that has been eroded through the use of the conduit. The application of hard surfacing can be accomplished via a number of techniques, including spraying and plasma, but is most typically by applying a series of weld beads along the interior surface of the conduit with each successive weld bead building on the adjacent weld bead.

The application of a wear resistant coating material by the placement of welding material on the interior surface of curved conduits is disclosed in U.S. Pat. No. 4,514,443, issued to Gene Kostecki on Apr. 30, 1985. In the Kostecki patent, a guide member is installed through the center of the curved conduit section and the weld placement apparatus is mounted to follow the guide member in the laying of weld beads along the length of the curved conduit segment. Similarly, Canadian Published Application No. 2,302,083, of Donald Hannu published on Mar. 27, 2000, discloses a track member on which a welding head is mounted to move along the track while depositing weld material along the interior surface of the conduit. In Canadian Published Patent Application No. 2,578,308 of Barry Kossowan, a three-axis robot arm is disclosed to provide for a radial and angular adjustment of the welding; however, the movement of the welding head through the conduit is also guided by a track extending longitudinally through the conduit.

Accordingly, it would be desirable to provide an apparatus that is operable to apply successive longitudinal weld beads along a curved conduit section without requiring the placement of a longitudinal guide track on which the welding head is carried while moving longitudinally through the conduit.

SUMMARY OF THE INVENTION

It is an object of this invention to overcome the aforementioned disadvantages of the known prior art by providing an apparatus for applying a wear coating on the interior surface of conduit elbows without requiring support members to be installed within the conduit.

It is another object of this invention to provide a versatile application member that is movable through the interior of a conduit section without requiring the installation of support members within the conduit, and is capable of carrying a selective appliance to perform various function, including the application of a wear coating, inspection of the interior of the conduit, painting the interior of the conduit, spraying a coating on the interior of the conduit.

It is still another object of this invention to provide an apparatus for applying a wear coating on the interior surface of conduits that consistently operates along the same path of travel through the conduit while making repeated passes through the conduit to apply strips of wear coating.

It is a feature of this invention that the apparatus for applying a wear coating on the interior surface of a conduit has a weld head that is supported on a wheel that runs along the bottom surface of the conduit.

It is an advantage of this invention that the wheel is positionally adjustable relative to the weld head to correspond to different conduit diameters so that the weld head can be consistently positioned in the center of the conduit.

It is another advantage of this invention that the consistent positioning of the weld head at the center of the conduit allows for a uniform application of a weld bead forming the wear coating on the interior surface of the conduit.

It is another feature of this invention that the weld head is coupled to a push/pull cart by a plurality of linkage elements that are interconnected by vertical pivots to allow the weld head to be traversed longitudinally through the conduit through the operation of the push/pull cart.

It is still another feature of this invention that the linkage elements are formed as hollow tubular members through which electrical wiring, control wiring and welding wire can be supported for utilization by the weld head.

It is still another advantage of this invention that the placement of the wiring within the interior of the tubular linkage elements retains the wiring in a spaced relationship from the hot weld beads formed by the weld head on the interior of the conduit.

It is still another feature of this invention that the push/pull cart is mounted on a linear frame for movement thereon externally of the conduit.

It is still another advantage of this invention that the linear movement of the push/pull cart can be easily controlled to accurately position the weld head within the interior of the conduit.

It is yet another feature of this invention that the weld head and the linkage elements are provided with centralizing joints that include a pair of transversely opposing rollers that engage the lateral sides of the interior of the conduit in which the wear coating is being applied.

It is yet another advantage of this invention that the centralizing joints keep the weld head and the linkage elements moving along the center of the conduit in which the wear coating is being applied.

It is a further advantage of this invention that the transversely opposed rollers are positionally adjustable to correspond to different diameters of conduit.

It is a further feature of this invention that the weld head is provided with a welding arm that has a three axis adjustment to locate the welding torch tip accurately for the positioning of each respective pass through the conduit for the application of sequentially placed weld beads in the creation of a wear coating on the interior surface of a conduit.

It is still a further advantage of this invention that the three axis adjustment for the welding torch tip is powered through three independently operable electric motors supported on the welding arm.

It is still a further feature of this invention that the welding arm includes a first positioning arm connected by a first pivot axis to a gearbox, a second pivot arm connected to the first pivot arm by a second pivot axis, and a welding torch tip connected to the second positioning arm by a third pivot axis to orient the welding torch tip at a desired welding angle.

It is another feature of this invention that the welding arm is connected to the head element by a pivot that allows the positioning of the weld arm at a selected bend angle with respect to the head element to correspond to the curvature of the conduit elbow into which the wear coating is being applied.

It is still another feature of this invention that the frame supporting the push/pull cart for linear movement thereof includes longitudinally extending supports for engagement with the transversely opposed rollers when located exteriorly of the conduit.

It is yet another feature of this invention that the frame supporting the push/pull cart also includes a base member for engagement of the support wheel on the head element when the weld head is being retracted out of the conduit into which the wear coating is being applied.

It is yet another advantage of this invention that the conduit into which the apparatus is applying a wear coating is supported on a plurality of elevator support stands as the weld head is being moved longitudinally within the conduit.

It is still another advantage of this invention that the elevator support stands are formed with an arcuate surface to mate with the conduit being supported thereby.

It is yet another advantage of this invention that the elevator support stands are vertically adjustable to provide proper support of the conduit.

It is still another object of this invention to provide an apparatus for applying a wear coating on an interior surface of a conduit having a nadir, including a support frame positioned externally of the conduit; a drive member mounted on the support frame for movement along the support frame; a wear coating application member operable to place the wear coating on the interior surface of the conduit, the wear coating application member including a support member engaging the nadir of the interior surface of the conduit and a pair of side engagement members engaging side portions of the interior surface of the conduit to provide a uniform path of movement of the wear coating application member through the conduit; a linkage apparatus interconnecting the drive member and the wear coating application member to transfer movement of the drive member to the wear coating application member to affect movement of the wear coating application member through the interior of the conduit.

It is an aspect of this invention that welding arm includes a welding torch tip supported on a movable arm assembly to position said welding torch tip at a desired location along the interior surface of the conduit, wherein the movable arm assembly includes a first positioning arm pivotally supported for movement about a horizontally oriented first axis of rotation; a second positioning arm pivotally connected to a remote end of said first positioning arm for pivotal movement about a second axis of rotation carried by said remote end of said first positioning arm; and a mounting member supporting the welding torch tip from a remote end of said second positioning arm. A drive member powers the pivotal movements of said first and second positioning arms through a first drive assembly including a first drive motor for selectively rotating the first positioning arm about the first axis of rotation; a second drive assembly including a second drive motor and a first drive shaft extending through said first axis of rotation to rotate a first drive mechanism carried by the first positioning arm to cause rotation of said second positioning arm about said second axis of rotation relative to said first positioning arm; and a third drive assembly including a third drive motor and a second drive shaft carried within said first drive shaft to rotate a second drive mechanism carried by said first positioning arm independently of said first drive mechanism, said second drive mechanism rotating a third drive mechanism carried by said second positioning arm to rotate said mounting member for selectively orienting the weld angle of said welding torch tip.

It is yet another object of this invention to provide a weld head for an apparatus that applies a wear coating on an interior surface of a conduit having a nadir, including a head element having a vertically oriented support member engaging the nadir of the conduit and opposing side engagement members for engaging side portions of the interior surface of the conduit; and a welding arm connected to said head element to deposit a weld bead along the interior surface of the conduit as said welding arm is moved along the interior of the conduit by the drive member, said welding arm including a welding torch tip supported on a movable arm assembly to position said welding torch tip at a desired location along the interior surface of the conduit, said support member and said side engagement members providing a uniform path of movement of said welding arm through the interior of the conduit.

It is another aspect of this invention that the weld head includes a first positioning arm pivotally supported for movement about a horizontally oriented first axis of rotation; a second positioning arm pivotally connected to a remote end of said first positioning arm for pivotal movement about a second axis of rotation carried by said remote end of said first positioning arm; a mounting member supporting the welding torch tip from a remote end of said second positioning arm; and a drive member for powering the pivotal movements of said first and second positioning arms.

It is a further object of this invention to provide an apparatus for applying a wear coating on an interior surface of a conduit having a nadir, including a support frame positioned externally of the conduit; a push/pull cart mounted on said support frame for movement along said support frame; a weld head having a welding torch tip operable to deposit weld beads on the interior surface of the conduit to create the wear coating, said weld head including a head element carrying a support wheel engaging the nadir of the interior surface of the conduit and a pair of transversely opposed side roller assemblies engaging side portions of the interior surface of the conduit to provide a uniform path of movement of the weld head through the conduit; and a plurality of linkage elements interconnecting the push/pull cart and the weld head to transfer movement of the push/pull cart along the support frame to the weld head to affect movement of the weld head through the interior of the conduit.

It is still another object of this invention to provide an apparatus for applying a wear coating on the interior surface of a straight or curved conduit section, including complex curved paths and elbows, which is durable in construction, inexpensive of manufacture, facile in assemblage, and simple and effective in use.

These and other objects, features and advantages are accomplished according to the instant invention by providing an apparatus for applying a wear coating on the interior surface of conduits, particularly conduit elbows, in which the weld head applying a weld bead forming the wear coating is supported by a wheel engaging the bottom surface of the conduit and interconnected with a push/pull cart mounted on a linear support frame exteriorly of the conduit by a plurality of linkage elements. Each of the head element and the linkage elements include a centralizing joint having a pair of transversely opposing rollers that engage the lateral sides of the conduit to maintain a consistent positioning of the welding arm at the distal end of the apparatus. The welding arm includes a three-axis adjustment for the welding torch tip for accurate location thereof within the conduit. Positional adjustment of the welding torch tip is provided by independent electric motors associated with each pivot axis in the welding arm.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 1A is an elevational view of an elevator pipe stand shown in FIG. 1 supporting the conduit elbow during operation of the apparatus for applying a wear coating on the interior surface of the conduit elbow;

FIG. 3 is an enlarged perspective view of two of the linkage elements with associated centralizing joints at the pivot connection between the linkage elements;

FIG. 4 is a front elevational view of the push/pull cart mounted on a portion of the frame support with the guide rails being broken away for purposes of clarity, and the first two linkage elements before being inserted into the conduit;

FIG. 4A is a rear elevational view of the push/pull cart and a portion of the first linkage element;

FIG. 10 is an enlarged top plan view of the centralizing joint at the end of each of the linkage elements and on the head element, the opposing rollers being adjustably positionable to engage the interior side surfaces of different diameter conduits; and FIG. 11 is an enlarged side elevational view of the centralizing joint shown in FIG. 10.

DETAILED DESCRIPTION OF THE PREFERRED EMBODIMENT

Figure 1:
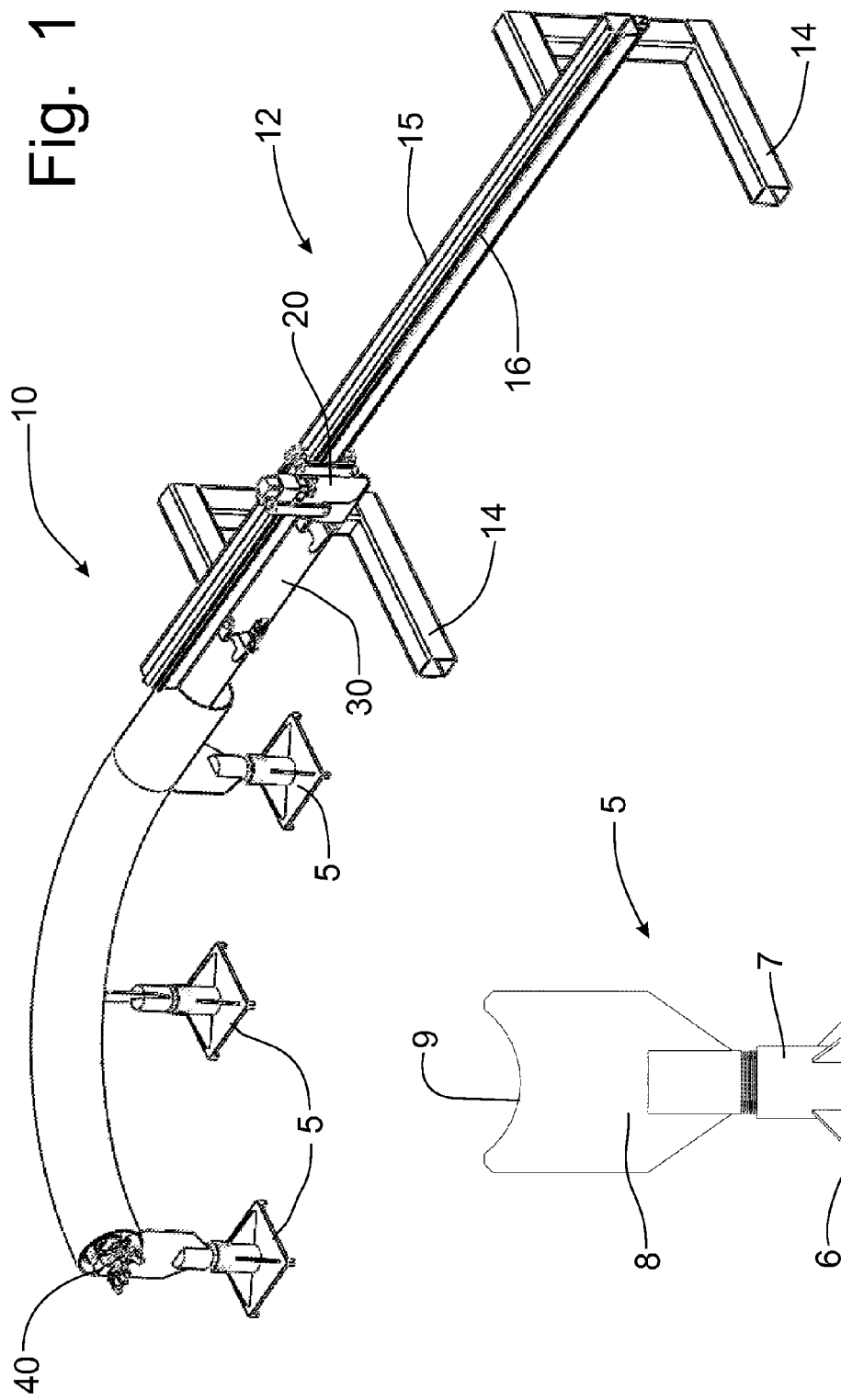
FIG. 1 is a perspective view of an apparatus incorporating the principles of the instant invention in operation to apply a wear coating on the interior surface of the conduit elbow supported on the three elevator pipe stands, portions of the frame support for the apparatus being removed for purposes of clarity in the viewing of the push/pull cart and the first linkage element.
Figure 2:
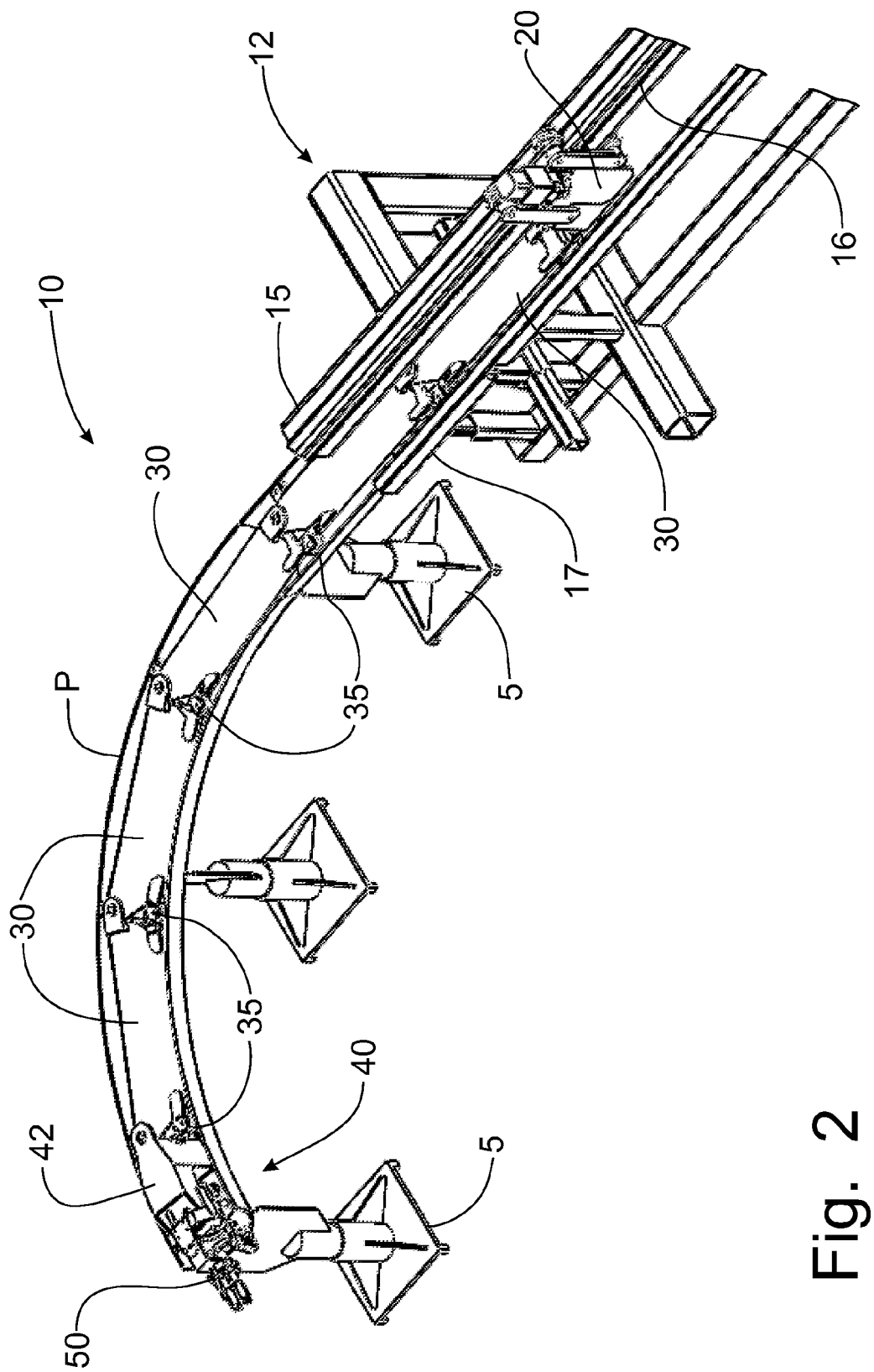
FIG. 2 is a perspective view of the apparatus, similar to the view of FIG. 1, but with the upper portion of the conduit removed to provide a view of the apparatus within the conduit, the frame support including guide rails for engagement with the centralizing joints of the linkage elements when retracted from the conduit.

Referring to FIGS. 1-2, an apparatus incorporating the principles of the instant invention can best be seen. The apparatus 10 is operable to apply a wear coating on the interior surface of the conduit P mounted on elevator pipe stands 5. As best seen in FIG. 1A, each elevator pipe stand has a reinforced base 6 formed with an upright threaded tubular receiver 7 into which the positionally adjustable support flange 8 is threaded. Although the preferred embodiment is to provide a threaded receiver 7, one skilled in the art will recognize that other forms of height adjustment, both manually and automated, could be utilized in lieu of a threaded receiver 7. The support flange 8 is formed with an arcuate engagement surface 9 to mate with the arcuate conduit P. The vertical adjustment of the support flange 8 relative to the base 6 can be accomplished manually or the threaded movement can be motorized to extend from or retract into the receiver 7. Preferably, three or more elevator pipe stands 5 will provide adequate support for the conduit P for operation of the apparatus 10 to provide a wear coating by depositing sequentially a series of longitudinally extending weld beads (not shown).

The process of providing a wear surface or coating on the interior surface of a conduit P is known in the art. The welding device is moved along the interior of the conduit P from one end to the other depositing a weld bead along the interior surface of the conduit P. Generally, the first weld bead is depositing along the center of the nadir of the conduit P. Then on subsequent passes of the welding device, weld beads are placed adjacent the previously deposited weld bead until the bottom half of the conduit is covered with weld beads to form the wear coating. The conduit p is then inverted and the process repeated so that the entire interior surface of the conduit P is covered with weld beads. The wear coating will preferably be formed with material having a hardness that is greater than the interior surface of the conduit P, such as tungsten carbide, boron and other metallic alloys, and even plastic coatings such as urethane, and is particularly advantageous in curved conduit segments, such as elbows, where material being conveyed within the conduit asserts greater friction.

As is best seen in FIG. 2, the apparatus 10 includes a linearly extending support frame 12 on which is mounted a drive member in the form of a push/pull cart 20 for movement along the support frame 12 to drive the movement of the apparatus 10. The distal end of the apparatus 10 includes a wear coating application member, such as a weld head 40, which deposits the weld beads on the interior surface of the conduit P. Interconnecting the weld head 40 and the push/pull cart 20 is a linkage apparatus in the form of a plurality of linkage elements 30 that are pivotally connected and carry the wiring for operation and control of the weld head 40 as the weld head 40 is moved through the conduit P by the push/pull cart 20. At each pivotal connection between the linkage elements 30, a centralizing joint 35 maintains the longitudinal ends of the linkage elements 30 at the center of the conduit P.

The support frame 12 is best seen in FIGS. 1, 2, 4 and 9 and consists of a pair of floor supports 14 that support an elevated, linearly extending main beam 15 on which is mounted the push/pull cart 20. The main beam 15 is formed with a rack 16 that is engaged by a drive pinion 25, as will be described in greater detail below, to power the movement of the push/pull cart 20 along the main beam 15. The support frame 12 is also provided with a pair of laterally spaced, and longitudinally extending in parallel with the main beam 15, guide rails 17 that are positioned to engage the rollers 37 of the centralizing joints 35 when the linkage elements 30 are retracted out of the conduit P. The guide rails 17 are supported on a width adjustment mechanism 18, such as a turnbuckle or the like, to move the opposing guide rails laterally to change the distance between them to correspond to different conduit diameters. The support frame 12 is also provided with a base member 19 that is aligned with the nadir of the conduit P to support the wheel 45 on the weld head 40 when the weld head 40 is extracted from the conduit P, as will be described in greater detail below.

Referring now to FIGS. 1, 2, 4, 4A and 9, the push/pull cart 20 is mounted on the main beam 15 and supported thereon by rollers 22 that capture the main beam 15 and allow the push/pull cart 20 to move along the length of the main beam 15. Preferably, the rollers 22 are formed as V-groove wheels that are self-centering on the track provided by the configuration of the main beam 15. The push/pull cart 20 incorporates a drive motor 24, preferably an electric motor, which rotates a drive pinion 25 that is positioned in engagement with the rack 16 extending along the length of the main beam 15. As the drive pinion 25 rotates the teeth traverse along the teeth on the rack and move the push/pull cart 20, and thus the entire apparatus 10 along the length of the support frame 12. The bottom portion of the push/pull cart 20 includes a drive head 27 that can be fixed to the chassis 21 of the push/pull cart 20 or pivotally connected thereto, but extends away from the cart 20 to connect with the linkage elements 30. The distal end of the drive head 27 carries a pivot pin 28 that pivotally connects the first linkage element 30 to allow the first linkage element 30 to pivot relative to the drive head 27 when the first linkage element 30 is inserted into a conduit elbow P.

The linkage elements 30 are substantially identical and the number thereof can vary depending on the length of the conduit P being wear coated. As is best seen in FIGS. 1-4 and 9, but particularly in FIG. 3, each linkage element 30 is formed as a hollow tubular member that is preferably circular, but can be formed in substantially any geometric shape in cross-section. Each linkage element 30 has a longitudinal length that extends from a proximal end 32 to a distal end 33. One of the ends 32, 33, preferably the distal end 33, carries a pivot pin 34 that connects the distal end 33 of one linkage element 30 to the proximal end 32 of the next succeeding linkage element 30. With respect to the first linkage element 30, the proximal end 32 is connected to the drive head 27 by the pivot pin 28. With this configuration, each linkage element 30 is pivotable in a generally horizontal plane about the vertically oriented pivot pin 34 carried by the preceding linkage element 30.

One of the ends 32, 33, preferably the distal end 33, of each linkage element 30 carries a centralizing joint 35 formed with a transversely oriented support bracket 36 carrying a pair of laterally opposing roller assemblies, which can include a single or multiple rollers 37, at the respective ends of the support bracket 36. The rollers 37 are selectively movable in a transverse direction by virtue of an adjustment linkage 38, best seen in FIGS. 10 and 11, so that the rollers 37 engage the opposing lateral sides of the conduit P to keep the joined distal and proximal ends 32, 33 of the corresponding adjacent linkage elements 30 centralized with respect to the conduit P. The transverse movement of the rollers 37 will accommodate different diameters of conduits P, while being operable to keep the joined ends 32, 33 in the center of the conduit P. One skilled in the art will recognize that the laterally spaced ends of the support bracket 36 can be configured to connect to multiple wheels positioned at each respective end of the support bracket 36. In fact, having multiple wheels at the opposed transverse ends of the support bracket 36 will enhance the centralizing function of the joint 35.

Figure 5:
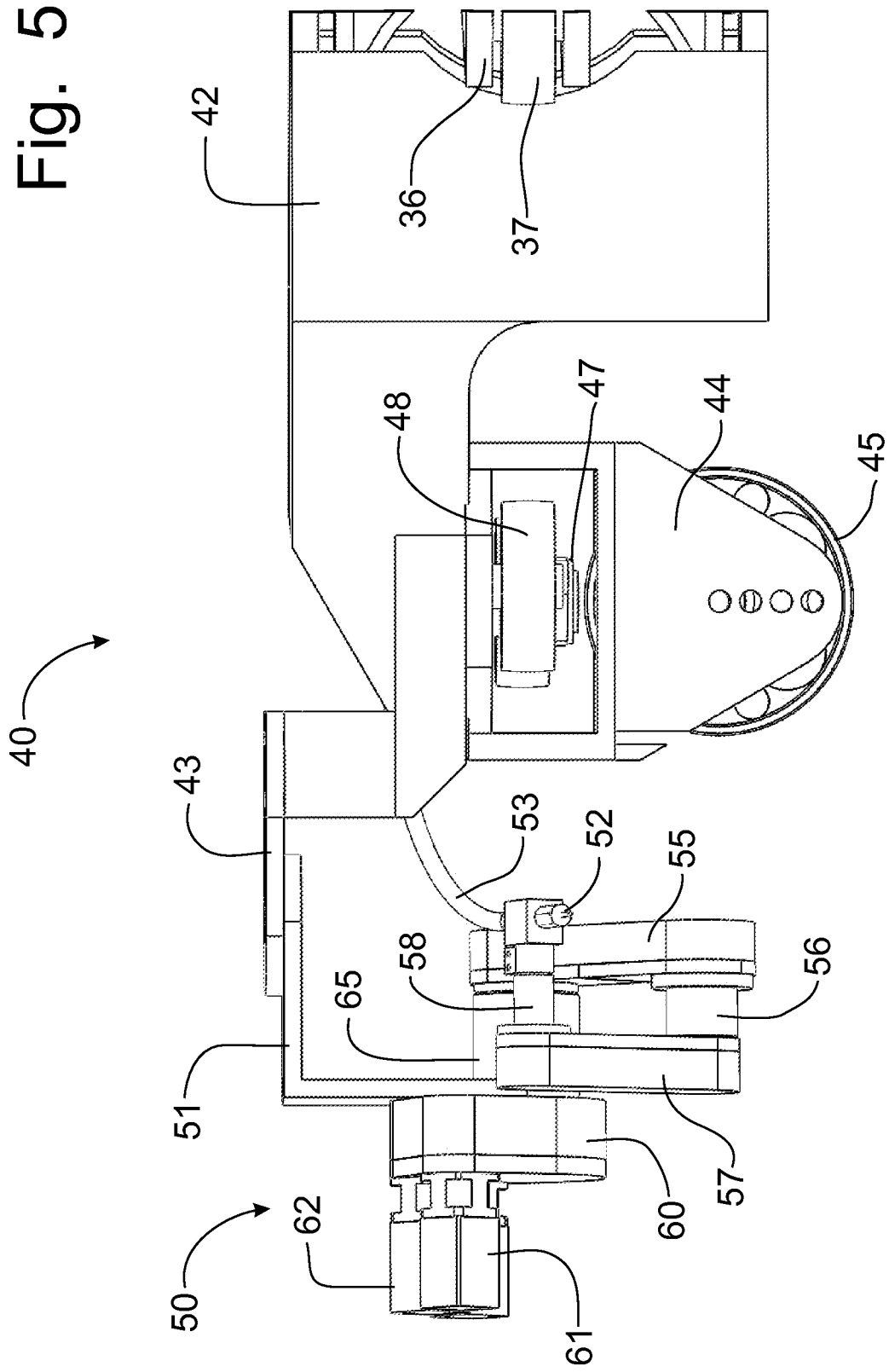
FIG. 5 is an elevational view of the weld head portion of the apparatus for applying a wear coating on the interior of a conduit, the welding arm being attached to the head element at a bend angle relative to the head element.
Figure 6:
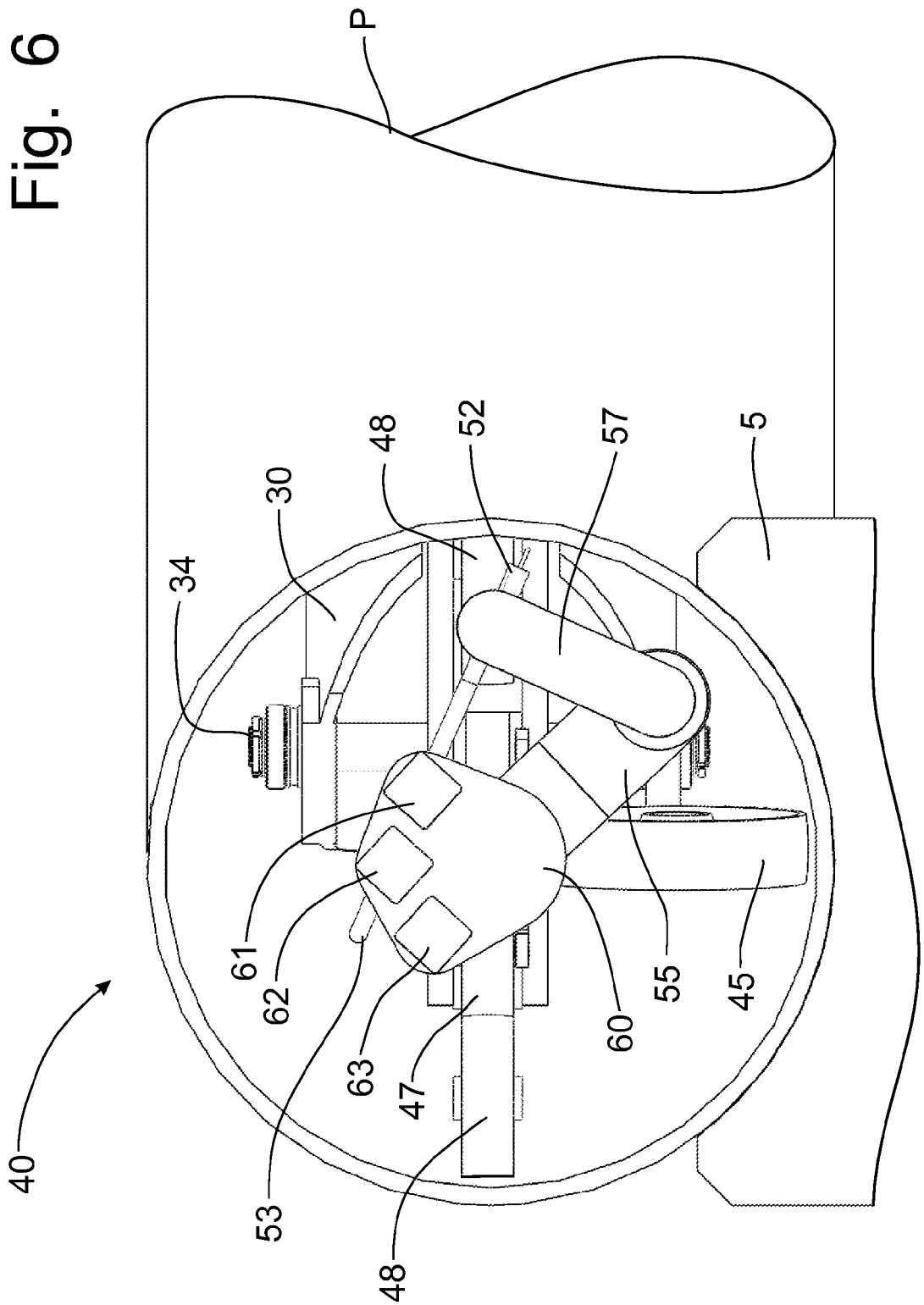
FIG. 6 is an end elevational view of the weld head at the distal end of the conduit, the elevator pipe stand being partially broken away.

Referring now to FIGS. 5 and 6, an application member 40 in the form of a weld head 40 can best be seen. The weld head 40 consists of a head element 42 and an appliance 50, such as a welding arm 50 that is connected to and extends forwardly of the head element 42. The head element 42 is pivotally connected to the last linkage element by the pivot pin 34 carried on the distal end 33 of the last linkage element 30. Thus, the head element 42 is pivotable in a generally horizontal plane about the pivot pin 34 carried by the last linkage element 30 to allow the head element 42 to bend around a curved conduit elbow P. The head element 42 includes a mounting bracket 43 to which the welding arm 50 is affixed to extend forwardly of the head element 42. Since the welding arm 50 does not have wheels or rollers that engage the interior surface of the conduit P, the welding arm 50 is secured to the mounting bracket 43 at an angle that corresponds to the bend in the conduit elbow P to enable the torch tip 52 to maintain a constant relationship to the interior surface of the conduit P for depositing a weld bead thereon, as will be described in greater detail below.

The distal end of the head element 42 includes the mounting bracket 43 and preferably a wheel bracket 44 that supports a vertically oriented support member, such as one or more support wheels 45, that is adjustably positionable to ride on the surface of the conduit P at the nadir thereof. The support wheel 45 is positionable within the wheel bracket 44 so that the wheel 45 can be mounted in a manner that corresponds to the diameter of the conduit P being wear coated and retains the axis of rotation of the output shaft 65 of the gear box 60 near the center of the conduit P. The distal end of the head element 42 is also provided with a centralizing bracket 47 that includes transversely opposed side engagement members, preferably in the form of rollers 48 that, like the rollers 37 on the centralizing joints 35, are positioned to ride on the side interior surfaces of the conduit P and keep the support wheel 45 centered on the nadir of the conduit P, and the welding arm 50 properly positioned to deposit weld beads on the interior surface of the conduit P.

The welding arm 50 includes a mating mounting bracket 51 that connects to the mounting bracket 43 of the head element 42 to secure the welding arm 50 at a fixed bend angle from the head element 42, which depends on the curvature of the conduit P. The welding arm 50 carries a welding torch tip 52 that is mounted at the end of a second positioning arm 57 as will be described in greater detail below. The torch tip 52 is connected to the feed line 53 to receive a supply of welding wire fed through the wire feed line 53. The wire feed line 53 is carried by the tubular linkage elements 30 back to a control apparatus (not shown) supported near the support frame 12 to provide electrical current and wire to the torch tip 52. The mating mounting bracket 51 supports at the distal end thereof a gear box 60 that controls the positioning of the welding torch tip 52 in relation to the interior surface of the conduit P. The output shaft 65 from the gear box 60 has mounted at the proximal end thereof a first positioning arm 55 that is movable about a first axis of rotation defined by the output shaft 65 of the gear box 60. The remote end of the first positioning arm 55 carries a forwardly projecting connecting shaft 56 that supports a second positioning arm 57 that is movable about a second axis of rotation defined by the connecting shaft 56. The second positioning arm 57 also carries at the remote end thereof a rearwardly extending mounting shaft 58 on which the welding torch tip 52 is mounted to be movable about the third axis of rotation defined by the mounting shaft 58.

One skilled in the art will recognize that the welding arm 50 is a particular form of an appliance 50 carried by an application member 40 that deposits a weld bead onto the interior surface of the conduit P to establish a hardened wear coating. Other forms of appliances 50 can also be utilized to provide other viable functions within the conduit, including inspections. Instead of a torch tip 52, the mounting shaft 58 could support a camera or an X-ray apparatus to inspect for faults in the conduit. Further, the mounting shaft could alternatively support a spray nozzle of different configurations to provide selective functions of painting the interior of the conduit or spraying a urethane coating, etc. For such alternative devices carried on the mounting shaft 58, the feed line 53 becomes a supply line 53 that would provide appropriate consumables, such as paint or urethane, or a data cable.

The gear box 60 is driven by three electric motors 61, 62, and 63 that are mounted on the gear box 60 at a position that is approximately central with respect to the conduit P so that the electric motors 61-63 can be adequately spaced from the heat of the weld beads being applied. As can be seen best in FIGS. 7 and 8, the three electric motors 61, 62, and 63 are independently operable and drivingly connected to a corresponding drive gear 64a, b and c supported within the gear box 60. The output shaft 65 is a multiple shaft device configured to connect to each of the corresponding drive gears 64a-64c such that each of the shaft components will rotate independently of the other shaft components. For example, electric motor 61 drives the drive gear 64a that is connected directly to the first positioning arm 55; electric motor 62 drives the center gear 64b that rotates a first driven gear 66 within the first positioning arm 55; and the third electric motor 63 drives a second driven gear 67 that is also housed within the first positioning arm 55.

Figure 7:
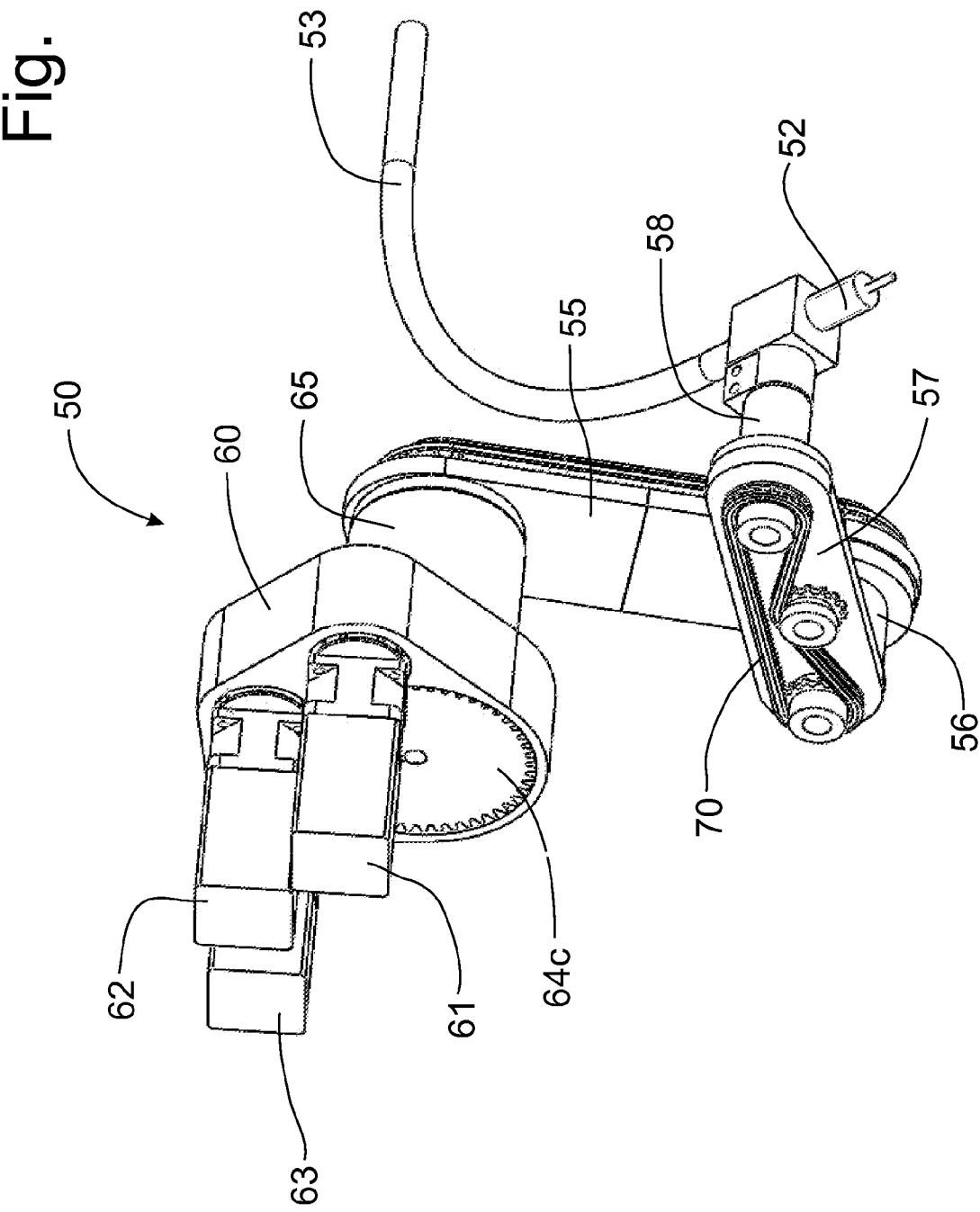
FIG. 7 is a perspective front detail view of the welding arm with covers on the gear box and the second positioning arm being removed to permit viewing of the drive mechanism within the corresponding components.
Figure 8:
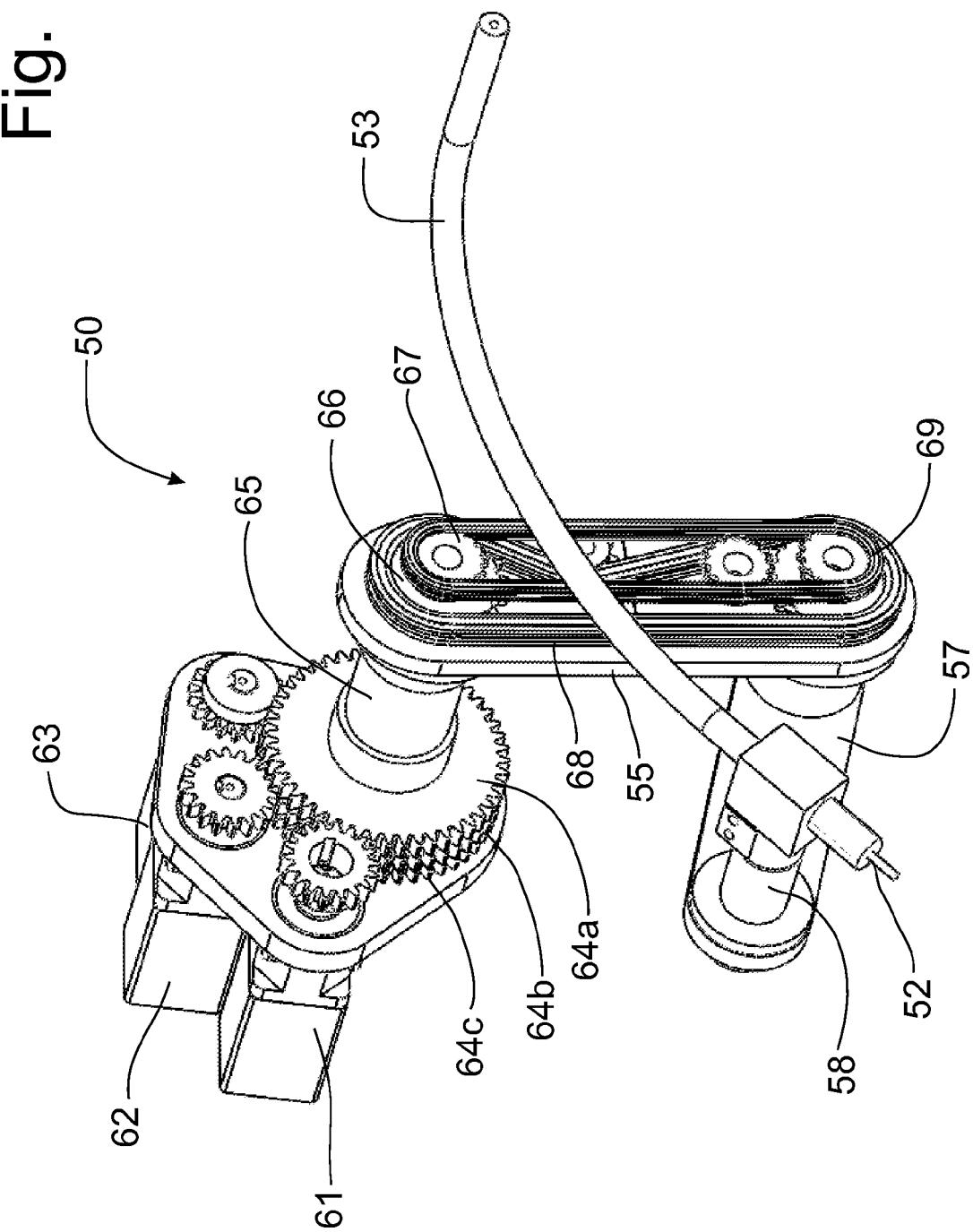
FIG. 8 is a perspective rear detail view of the welding arm with the gear box cover and the cover of the first positioning arm being removed to permit viewing of the drive mechanism within the corresponding components.
Figure 9:
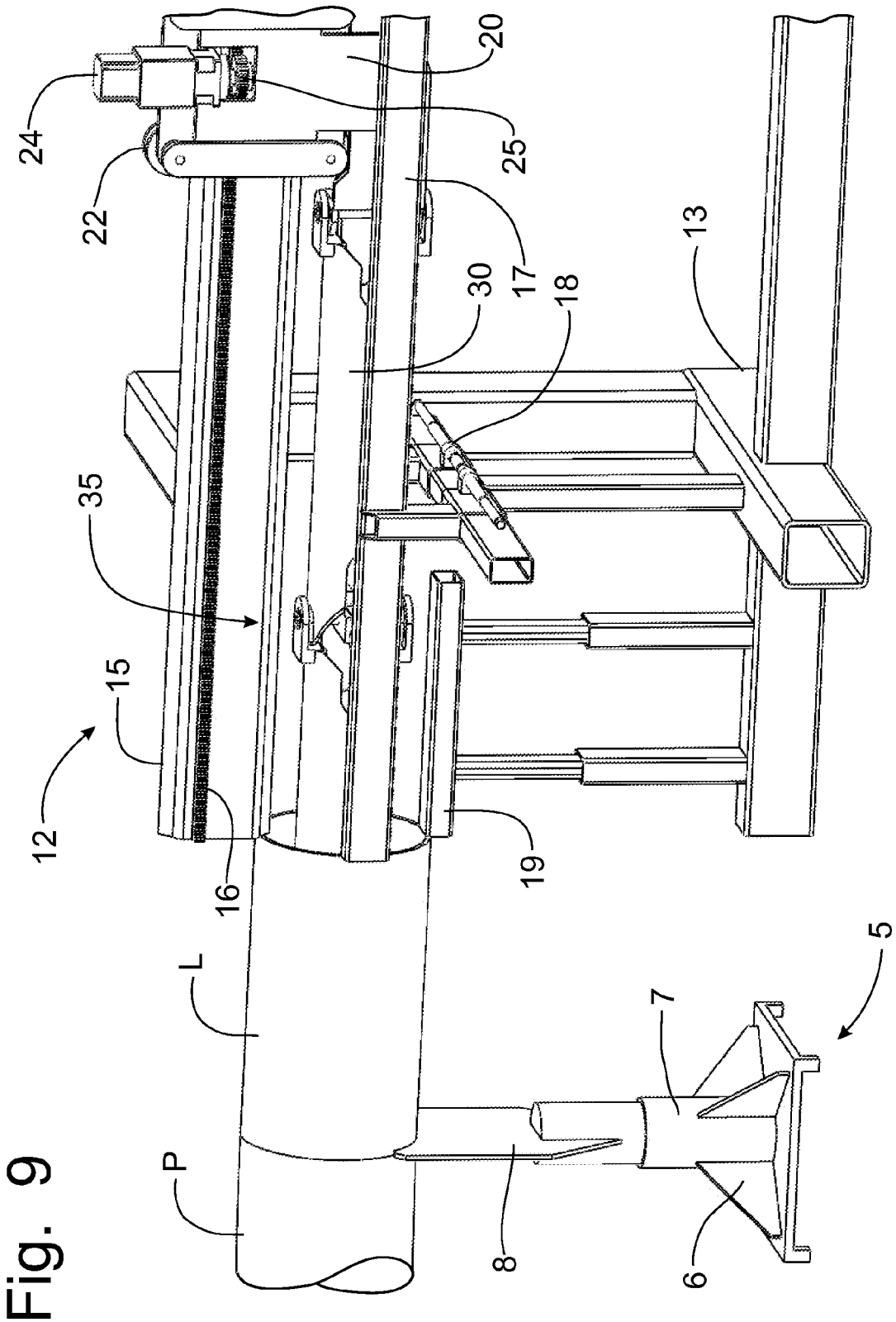
FIG. 9 is a front perspective view of a portion of the frame support for the push/pull cart at the proximal end of the conduit, the apparatus for applying a wear coating on the interior surface of the conduit being partially inserted into the conduit, the guide rails for the centralizing joints and the support beam for the support wheel on the weld head being shown.

As can be seen in FIG. 8, the first positioning arm 55 carries two independently operable drive mechanisms 68, 69. Each of the drive mechanism 68, 69 are positive drive devices, such as chains or toothed belts (for example, as a timing belt) on toothed sprockets, or a gear set extending from one end of the first positioning arm 55 to the other, so that the drive mechanisms 68, 69 will provide a predicable and repeatable movement for each increment of rotation of the drive mechanism 68, 69. The first drive mechanism 68 is coupled to the first driven gear 66 and serves to provide a direct rotation of the second positioning arm 57 about the connecting shaft 56 between the remote end of the first positioning arm 55 and the second positioning arm 57. The second drive mechanism 69 is coupled to the second driven gear 67 and drives a shaft that is operably connected to the third drive mechanism 70 carried in the second positioning arm 57, as is best seen in FIG. 7. The third drive mechanism 70 is also a positive drive device and is operable to rotate the mounting shaft 58 carrying the welding torch tip 52.

Accordingly, the three electric motors 61-63 can be operated to position the welding torch tip at any location within the conduit P to apply a desired weld bead to the interior surface thereof. The third electric motor 63 provides the final adjustment of the angle of the welding torch tip 52 to the interior surface of the conduit P to provide the optimum weld angle for depositing the desired weld bead. Preferably, the welding torch tip 52 can be oriented easily at an optimum weld angle to the interior surface of the conduit P.

Appliances 50, such as a torch tip 52, carry sensors that provide feedback to a control mechanism to indicate a number of parameters affecting the efficient operation of the appliance 50, such as voltage and current for the torch tip 52 and height sensing devices, including laser or ultrasonic, to determine the distance from the torch tip 52 to the surface being welded. One skilled in the art will recognize that a large distance between the torch tip 52 and the surface being welded, such as the interior surface of the conduit P can adversely affect the size and quality of the weld bead being deposited thereon. Thus, the feedback from the appliance sensors can be utilized in a real time scenario with the three-axis control of the appliance 50 to provide an immediate correction of the orientation or location of the torch tip 52 or other appropriate appliance 50 to provide maximum efficiency in the operation of the application member 40. Thus, the respective movements of the two positioning arms 55, 57, and the mounting shaft 58 are not only independent of one another, but are also coordinated with one another to provide proper orientation and placement of the appliance 50.

In operation, the push/pull cart 20 is moved along the support frame 12 to withdraw the weld head 40 to the proximal end of the conduit P to have a wear resistant coating applied to the interior surface thereof. As is shown in FIGS. 1 and 2, the conduit P being provided with a wear coating is typically a curved elbow that is bent to define a circular path through the interior of the conduit elbow P. Often the curved conduit elbow P is provided with a short linear section L that facilitates the welding of the elbow to the adjacent linear conduit sections that may or may not be provided with a wear coating. The wear resistant coating is applied by the welding torch tip 52 in the form of a series of adjacent weld beads on the interior surface of the conduit P.

To apply the first weld bead at the center of the nadir of the conduit section P, the weld head 40 is typically withdrawn to the proximal end of the conduit to position the welding torch tip 52 at the appropriate location and angle by manipulating the three electric motors 61-63 to move the three axes of rotation 65, 56 and 58 defined in the welding arm to position the torch tip 52 as desired. The push/pull cart 20 is then driven toward the conduit P to push the weld head 40 to the distal end of the conduit P, where the location of the torch tip 52 can be confirmed to be as desired. The welding torch tip 52 is then operated to deposit the first weld bead along the nadir of the conduit P as the push/pull cart 20 is driven along the main beam 15 by the electric drive motor 24 rotating the drive pinion 25 against the rack 16 at a uniform speed designed to deposit a uniform weld bead along the nadir of the conduit P until the torch tip 52 arrives at the proximal end of the conduit P.

The process is repeated, except that the torch tip 52 is repositioned to deposit a second weld bead along the side of the first weld bead from the distal end to the proximal end of the conduit P. The above process is again repeated multiple times to continue the application of weld beads against previous weld beads until the interior surface of the conduit P is coated with weld beads along an arcuate path of approximately 90 degrees to either side of the first weld bead. The conduit P is then turned over and the entire process is repeated until the full circumference of the interior surface of the conduit P is coated with weld beads.

Each time the push/pull cart 20 is moved along the main beam 15 to retract the weld head 40 to the proximal end of the conduit P, the rollers 37 on each successive linkage element 30 engage the guide rails 17 to keep the linkage elements 30 in line as they emerge from the conduit P. Ultimately, the wheel element 42 emerges from the conduit P and the support wheel 45 rides along the base member 19 as the welding arm 50 approaches the proximal end of the conduit P, while the rollers 48 also engage the guide rails 17 to keep the linkage elements 30 aligned with the emerged head element 42. Once inside the conduit P, the centralizing joints 35 keep the ends 32, 33 of the linkage elements 30 near the center of the conduit P and they respectively rotate at the pivot pin 34 to allow the weld head 40 to move to the distal end of the conduit P.

One skilled in the art will recognize that the weld head 40 does not have to be positioned precisely at the center of the conduit P as the three axis adjustment of the torch tip 52 will accommodate a substantial amount of displacement of the weld head 40 from the center of the conduit P. As long as the support wheel 45 and the rollers 48 keep the weld head moving along a uniform path through the conduit P, the welding torch tip 52 will be operable to deposit a uniform weld bead along the interior surface of the conduit P during each pass of the weld head 40 through the conduit P.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

For example, although the preferred embodiment of the instant invention described above applies a wear coating to the interior surface of the conduit by depositing adjacent weld beads with a MIG welder having the torch tip mounted on the weld arm as the weld arm traverses the longitudinal length of the conduit, one skilled in the art will recognize that other methods of applying a wear coating to the interior surface of the conduit can also be utilized by the instant invention simply by substituting the welding torch tip with another form of a wear coating application member. One such alternative is a spray head that applies the wear coating through a spray technique. The three axis positional adjustment of the gear box 60 and positioning arms 55, 57 would enable a spray applicator to be utilized in a flexible application process.

Furthermore, other functions can be accomplished through utilization of the instant invention to provide equivalent operation and function to the application of a wear coating. For example, the conduit section can be inspected from the interior of the conduit with an inspection head that can utilize X-rays, a camera or other fault detection technology to find cracks or faults in the structure of the conduit section and/or to identify weld thickness and to map coordinates for subsequent repairs to the conduit P. The applicator 50 can utilize a spray nozzle that can apply paint to the interior surface of the conduit P, or provide a spray coating thereon. As with the welding torch tip and alternative spray applicators, the three axis positional adjustment provided by the gear box 60 and the positioning arms 55, 57 provide a wide range of movement for an inspection tool supported on the mounting shaft 58.

Having thus described the invention, what is claimed is:

1. An apparatus for servicing an interior surface of a conduit having a nadir, comprising:
   a support frame positioned externally of the conduit;
   a drive cart mounted on said support frame for movement along said support frame;
   an application member operable to service the interior surface of the conduit, said application member including a pair of side engagement members engaging side portions of the interior surface of the conduit to provide a uniform path of movement of the application member through the conduit;
   a linkage apparatus interconnecting the drive cart and the application member to transfer movement of the drive cart to the application member to affect movement of the application member through the interior of the conduit, said linkage apparatus including a plurality of tubular linkage elements pivotally interconnected in an end-to-end relationship by vertically oriented pivot pins defining a pivot axis between adjacent said linkage elements to allow said linkage elements to follow a curved conduit.

2. The apparatus of claim 1 wherein said application member comprises:
   a head element on which said support member and said side engagement members are mounted; and
   a device connected to said head element to apply a coating along the interior surface of the conduit as said device is moved along the interior of the conduit by the drive cart.

3. The apparatus of claim 2 wherein said application member further includes a support member engaging the nadir of the interior surface of the conduit.

4. The apparatus of claim 3 wherein said support member is a vertically oriented support wheel and said side engagement members are rollers.

5. The apparatus of claim 2 wherein said device is supported on a movable arm assembly to position said device at a desired location along the interior surface of the conduit.

6. The apparatus of claim 5 wherein said device is selected from a group including a welding arm operable to deposit a weld bead on the interior surface of the conduit, a spray nozzle operable to spray a coating onto the interior surface of the conduit, and an inspection device for viewing or measuring the condition of the interior surface of the conduit.

7. The apparatus of claim 5 wherein the movable arm assembly comprises:
   a first positioning arm pivotally supported for movement about a horizontally oriented first axis of rotation;
   a second positioning arm pivotally connected to a remote end of said first positioning arm for pivotal movement about a second axis of rotation carried by said remote end of said first positioning arm;
   a mounting member supporting the device from a remote end of said second positioning arm; and
   a drive member for powering the pivotal movements of said first and second positioning arms.

8. The apparatus of claim 7 wherein said drive member comprises:
   a first drive assembly including a first drive motor for selectively rotating the first positioning arm about the first axis of rotation; and
   a second drive assembly including a second drive motor and a first drive shaft extending through said first axis of rotation to rotate a first drive mechanism carried by the first positioning arm to cause rotation of said second positioning arm about said second axis of rotation relative to said first positioning arm.

9. The apparatus of claim 8 wherein said drive member further includes a third drive assembly including a third drive motor and a second drive shaft carried within said first drive shaft to rotate a second drive mechanism carried by said first positioning arm independently of said first drive mechanism, said second drive mechanism rotating a third drive mechanism carried by said second positioning arm to rotate said mounting member for selectively orienting said device.

10. The apparatus of claim 9 wherein said first, second and third drive motors are mounted on a gear box and operatively connected to a corresponding drive gear rotatably housed within said gear box for independent operation relative to each other drive gear within the gear box.

11. The apparatus of claim 1 wherein each said linkage element is formed with a centralizing joint having a pair of transversely opposing roller assemblies that are positioned to engage the opposing lateral sides of the conduit, each said centralizing joint being located proximate to a corresponding pivot pin.

12. The apparatus of claim 11 wherein each said centralizing joint is located at the distal end of each respective said linkage element.

13. The apparatus of claim 12 wherein said support frame includes:
   a pair of laterally spaced guide rails positioned to engage said roller assemblies as the roller assemblies emerge from the conduit; and
   a beam member positioned to support said support member when said head element is retracted from the conduit.

14. A wear coating application head for an apparatus that applies a wear coating on an interior surface of a conduit having a nadir, comprising:
   a head element having opposing side engagement members for engaging side portions of the interior surface of the conduit; and
   an application arm connected to said head element to deposit a wear coating along the interior surface of the conduit as said application arm is moved along the interior of the conduit by a drive member, said application arm including an appliance supported on a movable arm assembly to position said appliance at a desired location along the interior surface of the conduit, said side engagement members providing a uniform path of movement of said application arm through the interior of the conduit, said movable arm assembly including
      a first positioning arm pivotally supported for movement about a horizontally oriented first axis of rotation;
      a second positioning arm pivotally connected to a remote end of said first positioning arm for pivotal movement about a second axis of rotation carried by said remote end of said first positioning arm;
      a mounting member supporting the appliance from a remote end of said second positioning arm; and
      a drive member mounted on said movable arm assembly for powering the pivotal movements of said first and second positioning arms.

15. The wear coating application head of claim 14 wherein said drive member comprises:
   a first drive assembly including a first drive motor for selectively rotating the first positioning arm about the first axis of rotation; and
   a second drive assembly including a second drive motor and a first drive shaft extending through said first axis of rotation to rotate a first drive mechanism carried by the first positioning arm to cause rotation of said second positioning arm about said second axis of rotation relative to said first positioning arm.

16. The wear coating application head of claim 15 wherein said appliance is a welding torch tip operable to deposit a weld bead on the interior surface of the conduit, said drive member further includes a third drive assembly including a third drive motor and a second drive shaft carried within said first drive shaft to rotate a second drive mechanism carried by said first positioning arm independently of said first drive mechanism, said second drive mechanism rotating a third drive mechanism carried by said second positioning arm to rotate said mounting member for selectively orienting the weld angle of said welding torch tip.

17. The wear coating application head of claim 16 wherein said first, second and third drive motors are mounted on a gear box and operatively connected to a corresponding drive gear rotatably housed within said gear box for independent operation relative to each other drive gear within the gear box.

18. An apparatus for coating an interior surface of a conduit having a nadir, comprising:
   a support frame positioned externally of the conduit;
   a drive cart mounted on said support frame for movement along said support frame;
   an application member operable to apply a coating on the interior surface of the conduit, said application member including a pair of side engagement members engaging side portions of the interior surface of the conduit and a support member engaging the nadir of said conduit to provide a uniform path of movement of the application member through the conduit;
   a linkage apparatus interconnecting the drive cart and the application member to transfer movement of the drive cart to the application member to affect an unguided movement of the application member through the interior of the conduit.

19. The apparatus of claim 18 wherein said linkage apparatus includes a plurality of linkage elements pivotally interconnected in an end-to-end relationship by vertically oriented pivot pins defining a pivot axis between adjacent said linkage elements to allow said linkage elements to follow a curved conduit.

20. The apparatus of claim 19 wherein each said linkage element is formed with a centralizing joint having a pair of transversely opposing roller assemblies that are positioned to engage the opposing lateral sides of the conduit, each said centralizing joint being located proximate to a corresponding pivot pin.

21. The apparatus of claim 20 wherein said application member comprises:
   a head element on which said support member and said side engagement members are mounted; and
   a weld head mounted on said head element to apply a coating of weld material along the interior surface of the conduit as said weld head is moved along the interior of the conduit by the drive cart.

22. The apparatus of claim 21 wherein said side engagement members and said support member are wheels rotatably supported on said head element.

* * * * *

UNITED STATES PATENT AND TRADEMARK OFFICE
CERTIFICATE OF CORRECTION

PATENT NO.         : 8,513,559 B2
APPLICATION NO.    : 12/978230
DATED              : August 20, 2013
INVENTOR(S)        : Randel Brandstrom Page 1 of 1

It is certified that error appears in the above-identified patent and that said Letters Patent is hereby corrected as shown below:

Title Page, item (73), the name of the Assignee of this patent should read:

Randel Brandstrom

Signed and Sealed this
Twelfth Day of November, 2013

Teresa Stanek Rea
*Deputy Director of the United States Patent and Trademark Office*